United States Patent
Bechaz et al.

[11] Patent Number: 6,059,129
[45] Date of Patent: May 9, 2000

[54] CLAMPING ARRANGEMENT OF AN EQUIPMENT MODULE ON A SUPPORTING RAIL AND MODULE FOR SUCH AN ARRANGEMENT

[75] Inventors: Bernard Bechaz, Caluire; Luc Doutaz, Bron; Philippe France, Chazelles/Lyons, all of France

[73] Assignee: Entrelec S.A., Villeurbanne, France

[21] Appl. No.: 09/032,468

[22] Filed: Feb. 26, 1998

[30] Foreign Application Priority Data

Feb. 28, 1997 [FR] France .................................. 97 02373

[51] Int. Cl.[7] .......................................................... A47F 5/08
[52] U.S. Cl. ......................................................... 211/94.01
[58] Field of Search .................................. 211/26, 94.01, 211/162; 361/725, 726, 729, 730, 732, 747, 807, 809, 825, 634

[56] References Cited

U.S. PATENT DOCUMENTS

| | | | |
|---|---|---|---|
| 4,167,769 | 9/1979 | Luke et al. | 361/361 X |
| 4,222,019 | 9/1980 | Rusch | 335/6 |
| 4,251,851 | 2/1981 | Diersing et al. | 361/363 |
| 4,700,846 | 10/1987 | Schroeder | 211/94.01 X |
| 4,900,275 | 2/1990 | Fasano | 439/716 |
| 5,047,604 | 9/1991 | Grass et al. | 200/294 |
| 5,768,091 | 6/1998 | Vinson et al. | 361/825 X |

FOREIGN PATENT DOCUMENTS

| | | |
|---|---|---|
| 0602305 | 6/1994 | European Pat. Off. . |
| 2708385 | 2/1995 | France . |
| 2730353 | 8/1996 | France . |
| 7609710 | 9/1976 | Germany . |
| 3728907 | 3/1989 | Germany . |
| 1395844 | 5/1975 | United Kingdom . |
| 9316518 | 2/1994 | United Kingdom . |

Primary Examiner—Daniel P. Stodola
Assistant Examiner—Erica B. Harris
Attorney, Agent, or Firm—Ware, Fressola, Van Der Sluys & Adolphson LLP

[57] ABSTRACT

A clipping arrangement for clipping an electrical or electro-optical equipment module onto a support rail (1), the arrangement comprising a rigid hook-forming first portion (5) adapted to hook onto a first edge of the rail, and a catch-forming second portion (6) which is adapted to hook onto a second edge of the rail under the action of a resilient return force and which can be driven remotely by a tool blade that is inserted into a remotely located hole-forming driver device (7) provided in the arrangement to enable the blade to act by leverage. The driver device of the arrangement is connected to the second portion on which the device acts via a force-transmitter device (15, 16, 17), it thus being possible to position the driver device remotely from said second position.

7 Claims, 2 Drawing Sheets

CLAMPING ARRANGEMENT OF AN EQUIPMENT MODULE ON A SUPPORTING RAIL AND MODULE FOR SUCH AN ARRANGEMENT

BACKGROUND OF THE INVENTION

1. Field of the Invention

The invention relates to an arrangement for clipping small equipment modules, in particular electrical and electro-optical equipment modules, onto a support rail designed to carry a row of modules of this type. It therefore also relates to modules provided with such arrangements.

2. Description of the Related Art

A conventional form of mounting used for installation purposes, in particular for electrical installation purposes, implements support rails in the form of standardized shaped-section members organized to receive rows of small electrical and electro-optical equipment modules, in particular circuit and/or connection modules to which electrical wires and optionally optical fibers are connected.

Conventionally, the modules are mounted on the rails by being clipped onto them, as shown diagrammatically in FIG. 1 for a support rail 1'.

Such a rail 1 is fixed horizontally to at least one generally vertical carrying element, such as, for example, a vertical wall 2' of an equipment cabinet, or vertical members of a frame (not shown), the fixing being symbolized by a fastener comprising a bolt 3' and a nut 3".

Each module, such as the module 4', is provided with a clipping arrangement for clipping it onto the rail, the arrangement conventionally including a rigid hook-forming portion 5' organized to hook onto a top edge of a rail that is fixed horizontally, and to cause the weight of the module to be supported by the rail. A catch-forming portion 6' that is organized to move resiliently and mechanically relative to the remainder of the module, completes the mounting of the module by latching onto a bottom edge of the rail, and, depending on the position that it takes up, it either holds the module to the rail, or else it enables the module to be mounted on the rail or to be removed therefrom.

The portion 6' of a module is often provided with a shape, e.g. a blind hole, such as 7', into which the end 8 of a tool blade, conventionally a screwdriver blade, can be inserted so that the catch-forming portion 6' can be levered by means of the blade from a first position into a second position, and optionally vice versa when the portion 6' does not return resiliently to a given position.

The mouth of the tool-blade receiving blind hole 7' in a module is generally placed at the edge of the module, generally at the edge of or between other modules and as shown in particular in the sole figure of Document FR-A-2 708 385, and it is open towards the front of the module when the module is mounted on the rail so as to enable a tool blade to be inserted into it regardless of the objects or walls that might be placed in the vicinity of the module once the module is in place on the rail. In many cases, it is necessary to ensure a module can be accessed via at least one of its faces, a front face in this example, to enable action to be taken on it without having to dismount the module and any other module that is connected to it, and in particular without having to disconnect the wires and/or fibers that are connected thereto.

Unfortunately, there are many cases in which it can be impossible to access the mouth of the tool-blade receiving hole in a module after the wires or fibers for connection to the module have been connected thereto, as can be seen in FIG. 2.

If the module 4' shown in FIG. 1 includes a row of screw connection terminals 9' having their screw heads accessible on the front face, as shown in the front view of FIG. 2, and receiving wires 10' that are connected to the terminals so that said wires are substantially parallel to one another, as shown beneath the module, it can be difficult or even impossible to insert the tool blade through the layer of wires 10' into the blind hole 7' which, in this example, is assumed to be positioned centrally in the portion 6' in which it is provided.

If the terminals in the row of terminals are very close together, as is often necessary in the equipment modules under consideration, the spacing "d" between adjacent wires 10' can be too narrow to allow a tool blade to pass through.

SUMMARY OF THE INVENTION

The invention therefore provides a clipping arrangement for clipping an electrical and/or electro-optical equipment module onto a support rail for receiving a row of modules of this type.

In conventional manner, the arrangement comprises a rigid hook-forming first portion designed to hook onto a first edge of the rail, preferably the top edge when the rail is fixed horizontally, and a catch-forming second portion which is designed to hook onto a second edge of the rail under the action of a return force and which can be driven externally, at least for releasing it, by means of a tool blade that is inserted into a hole-forming driver device provided in the arrangement to enable the blade to act by leverage.

According to a characteristic of the invention, the driver device of the arrangement is connected to the second portion on which the device acts via a force-transmitter device, it thus being possible to position the driver device remotely from said second portion.

According to a characteristic of the invention, the clipping arrangement includes a force-transmitter device that is constituted by a rigid piece that is elongate in shape and that is connected via hinges firstly to the driver device, and secondly to the second portion.

According to a characteristic of the invention, the clipping arrangement includes a second portion, a driver device, and a force-transmitter device that are made in one piece of integrally molded material.

According to a characteristic of the invention, the clipping arrangement includes: a driver device in the form of a tubular element forming a tool-blade receiving hole that is blind, the tubular element being connected firstly to the force-transmitter device via a hinge situated in the vicinity of the end wall of the blind hole, and secondly to a rigid structure including the first portion of the arrangement via a hinge which is situated in the vicinity of the mouth of the hole; as well as a catch-forming second portion provided with a shaped-section snap-fastening region of increased thickness for snap-fastening onto one edge of rail, which region is carried by a segment of wall which has a free end on which the region of increased thickness is situated, and which is connected via a hinge arc to the rigid structure which includes the first portion of the arrangement, said segment of wall also being connected to the force-transmitter device via a hinge situated between the hinge arc and the region of increased thickness on the same side of the segment of wall as said region of increased thickness.

The invention also provides an electrical and/or electro-optical equipment module organized to be mounted on a rail serving as a support for a row of modules.

According to a characteristic of the invention, the module includes a clipping arrangement as defined above.

According to a characteristic of the invention, the module includes an integrally molded single piece forming a base including the clipping arrangement.

According to another characteristic of the invention, the module includes a portion forming a cover which is positioned on the base, in particular over the mouth of the hole provided in the driver device, and the cover is provided with an opening enabling the device to be driven by means of a tool having a blade whose end is inserted into said hole.

The invention, its characteristics, and its advantages are explained in more detail in the following description given with reference to the following figures:

DETAILED DESCRIPTION OF THE INVENTION

Figure 1:
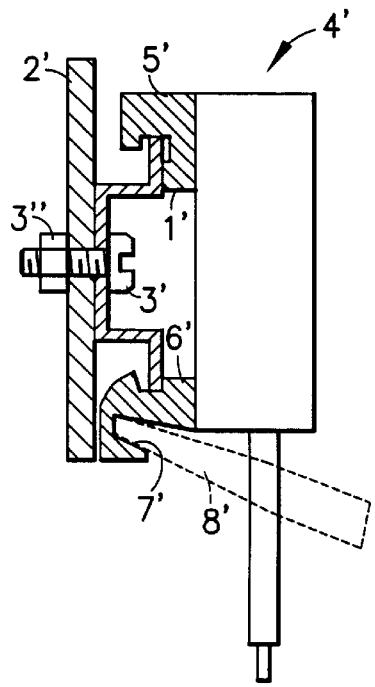
FIG. 1 is a diagrammatic section view showing a known arrangement for clipping a module onto a support rail.
Figure 2:
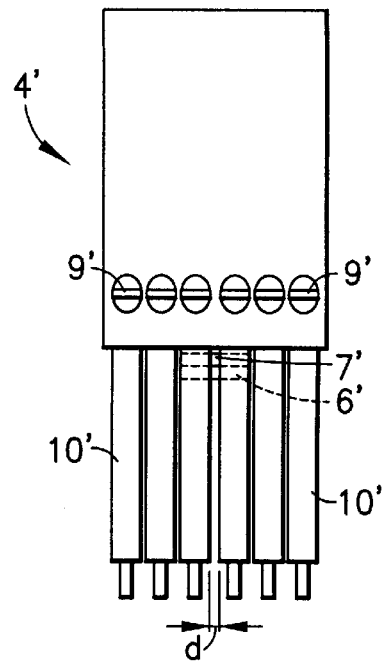
FIG. 2 is a front view of the arrangement shown in FIG. 1.

The example of the equipment module 4' shown in FIG. 1 is of the electrical and/or electro-optical connection module type which is encountered in numerous industrial facilities. It is designed to be mounted on a support rail 1', assumed in this example to be a channel section member of standard type, itself fixed horizontally to a support that is at least approximately vertical, e.g. a wall referenced 2' as above.

Figure 3:
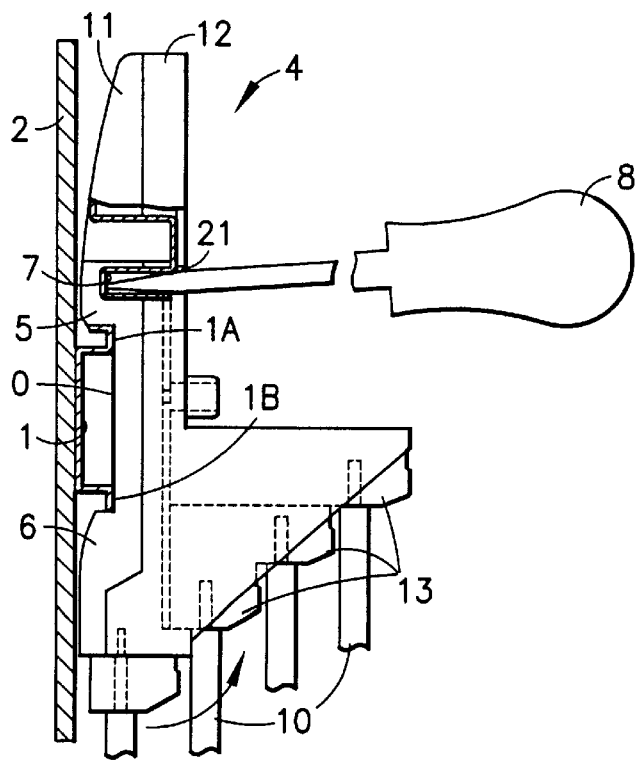
FIG. 3 shows an example of an equipment module including a clipping arrangement of the invention.

In a preferred embodiment shown in FIG. 3, the equipment module 4 includes a rigid structure forming a base 11, which base is provided with a clipping arrangement enabling it to clip onto the support rail 1. In this example, the module is assumed to be provided with a cover 12 that is fixed to the base 11.

For example, the base 11 may be in the form of a housing that is approximately rectangular block shaped, that is open over one of its large faces, and that has a back, a portion of which 0 is designed to come into abutment against the two longitudinal abutment zones 1A and 1B provided at the ends of the flanges of the channel-section rail.

The equipment module 4 can be provided with various members. In the example chosen, these members are assumed to comprise connection terminals 13 for external wires 10, the terminals being lined up in rows in respective ones of a plurality of stages, along an alignment axis of the module and thus of the base, which axis is parallel to longitudinal axis of the support rail 1 when the module is mounted on the rail, itself fixed as indicated above.

Figure 4:
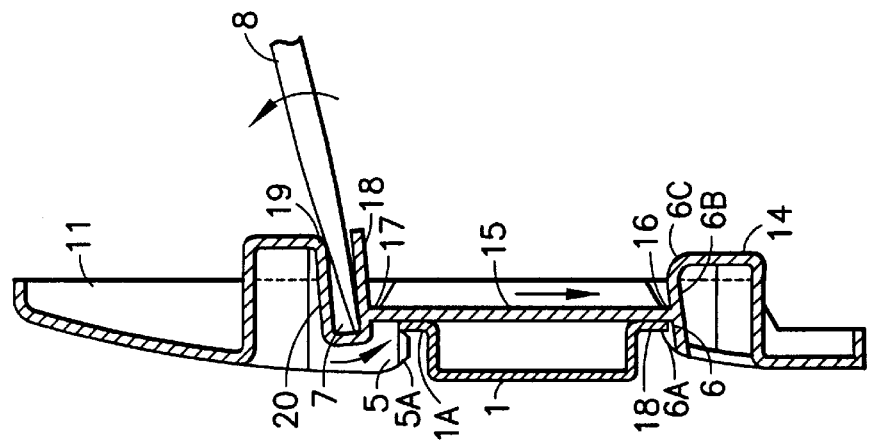
FIG. 4 is a section view on IV—IV through the base of a module such as the module shown in FIG. 3.

The module 4 is clipped on via its base 11 in the above-mentioned conventional manner by means of an arrangement including a rigid hook-forming first portion 5 which, in this example, is assumed to be incorporated into the base 11, and which is designed to hook over the top of a first edge of the support rail 1 (its top edge in this example) under the weight of the module, the support rail being assumed to be positioned as indicated above and as shown in FIG. 4.

The clipping arrangement for clipping the module 4 onto the rail also includes a catch-forming second portion 6 that completes securing of the base, and thus of the module, to the rail by latching under a second edge of the rail (the bottom longitudinal edge in this example) so as to clamp onto said second edge under the action of a return force, assumed to be a resilient return force in this example.

The portion 6 is organized to be moveable to some extent under the action of an external force exerted by a tool, this moveability being assumed, in this example, to be due to this portion being relatively resilient due to the shape and the nature of the material of the base, as has been conventional in this field for many years.

The base is mounted on the rail in the usual manner by initially hooking the hook constituted by the rigid portion 5 of the base onto the top longitudinal edge of the rail, so that the base hangs down under its own weight. Fastening is performed by pressing the base hard towards the wall. The semi-resilient catch formed by the portion 6 then clamps around the bottom edge of the rail onto which it is snap-fastened once the free end of the catch of portion 6 has passed under the bottom edge by being elastically deformed under the effect of the pressure exerted.

In the example proposed, the hook or catch of a portion 5 or 6 is formed by a shaped snap-fastening region of increased thickness 5A or 6A projecting from a wall of the portion 5 or 6 in question so that it co-operates with the wall from which it projects to form a groove. The groove receives the end of one of the longitudinal edges of the rail, the edge of the rail then being clamped in the groove.

Releasing the base from the rail to which it has been fastened is obtained by means of a driver device making it possible to exert a force that acts on the catch of the portion 6 which is semi-resilient at least in part. This force deforms the catch-forming portion and forces the snap-fastening region of increased thickness to move away from the bottom edge of the rail, thereby enabling the base to be released from the rail at this level. It is then possible to raise the base once it has been tilted slightly relative to the wall so as to release the base completely from the rail.

In accordance with the invention, a segment of wall 6B of the portion 6, from which segment the snap-fastening region of increased thickness projects, constitutes the element by means of which the portion 6 is relatively resilient so as to enable the region of increased thickness to move as indicated above.

In the embodiment presented, the segment of wall 6B is connected via a semi-resilient hinge arc 6C to a segment of wall 14 of the base 11, with which it forms an angle that is, in this example, slightly less than a right angle, the wall element 14 being at least approximately parallel to the wall 2, when the base is in place on the rail 1. The hinge arc enables the angle formed by the segments of wall 6B and 14 to be modified to a limited extent, and thus enables the region of increased thickness 6A to be displaced to a limited extent from a position into which it is urged naturally because of its resilience.

In accordance with the invention, a force-transmitter device makes it possible to position the driver device remotely from the portion 6. In this example, the force-transmitter device is a rigid piece that is elongate in shape, e.g. a rod 15. The rod is hinged to the segment of wall 6B to make it possible to displace said segment of wall relative to the segment of wall 14 to which it is hinged, by causing the angle that the segments of wall form to vary.

In the embodiment proposed, the rod 15 extends at least approximately parallel to the back of the base, and orthogonal to the alignment axis of the base as indicated above. It is thus also disposed orthogonally relative to the longitudinal axis of the rail carrying the base when said base is mounted thereon.

In accordance with the invention, the rod 15 is positioned in the base that includes it in a manner in particular making it possible to push on the segment of wall 6B so as to move this wall and the region of increased thickness 6A that it carries away from the bottom edge of the rail 1 against which edge the wall and the region of increased thickness are resiliently urged when the base is fastened to the rail.

In the example proposed, the rod 15 is integrally molded with the remainder of the base 11 with which it forms a single piece, and it is connected to the segment of wall 6B of the base via an integrally molded hinge 16 formed at one of its ends and disposed parallel to the alignment axis of the base. This hinge is designed in a manner known to person skilled in the art to transmit the forces directed along the longitudinal axis of the rod to the segment of wall 6B, and to accommodate any change in the angular position of the rod relative to the wall during the design limited-amplitude displacements of the rod.

In one embodiment, the hinge 16 is formed by a one-sided and localized region of reduced thickness on the rod in the vicinity of the wall 6B and on the other side of the rod from the region of increased thickness 6A carried by said wall. The rod 15 slides close to the rail so that the forces are transmitted to the wall 6B as close as possible to the region of increased thickness 6A projecting from said wall, and therefore as far as possible from the hinge arc 6C so as to increase the resulting leverage.

The second end of the rod 15 bears via a hinge 17 analogous to the hinge 16 against a wall 18 of a driver device constituted in the form of a tubular element delimiting a blind hole 7 organized to receive a tool end in the same way as the blind hole shown in FIG. 1. The blind hole 7 is angularly positioned such that it opens out in the open face of the housing formed by the base, and, in the embodiment presented, it is disposed orthogonally relative to the axis of alignment of the base when it is in a position into which it is urged naturally because of the characteristic resilience of a hinge 19 that is connected to the remainder of the base.

In this example, the hinge 19 is angularly positioned parallel to the hinges 16 and 17, and it is constituted in the same way hinge 19 is. It is placed at the mouth of the blind hole 7, whose cross-section is rectangular in shape, on a wall 20 of the hole that is opposite from the wall 18 carrying the hinge 17. The hinge 17 is placed in the vicinity of the end wall of the blind hole 7 so that the rod 15 is at least approximately parallel to the rail, as indicated above.

Before the base 11 is mounted on a support rail, the blind hole 7 and the wall 6B of the base are in a determined initial equilibrium position in which no external force is exerted on either of them, in the example presented, the blind hole then being substantially orthogonal to the back 0.

Putting the base 11 in place on the support rail causes the wall 6B to press against the bottom edge of the rail, this pressure being created by the reaction of the hinges 6C, 16, 17, and 19 which are all urged resiliently back into their respective initial positions.

The end wall 18 of the blind hole 7 in the base 11 being displaced under the action of a tool blade acting by leverage and bearing firstly against the end wall of the hole and secondly against the wall 20 in the vicinity of the hinge 19, as shown in FIG. 4. This action displaces the rod 15 which pushes the wall 6B outwards because of the complementary actions of the hinges as mentioned in the preceding paragraph. This pushing enables the catch formed in the portion 6 of the base to be released from the bottom edge of the rail, and it then enables the base to be tilted relative to the rail, and therefore optionally to be unclipped therefrom.

In the embodiment proposed, the hinge 17 of the rod 15 tends to move away from the back 0 of the base because of the rotation that takes place at the hinge 19 when the tool blade is used as indicated above, thereby facilitating the action of releasing the region of increased thickness 6A caused by the slanting thrust then exerted by the rod 15 on the wall 6B.

Figure 5:
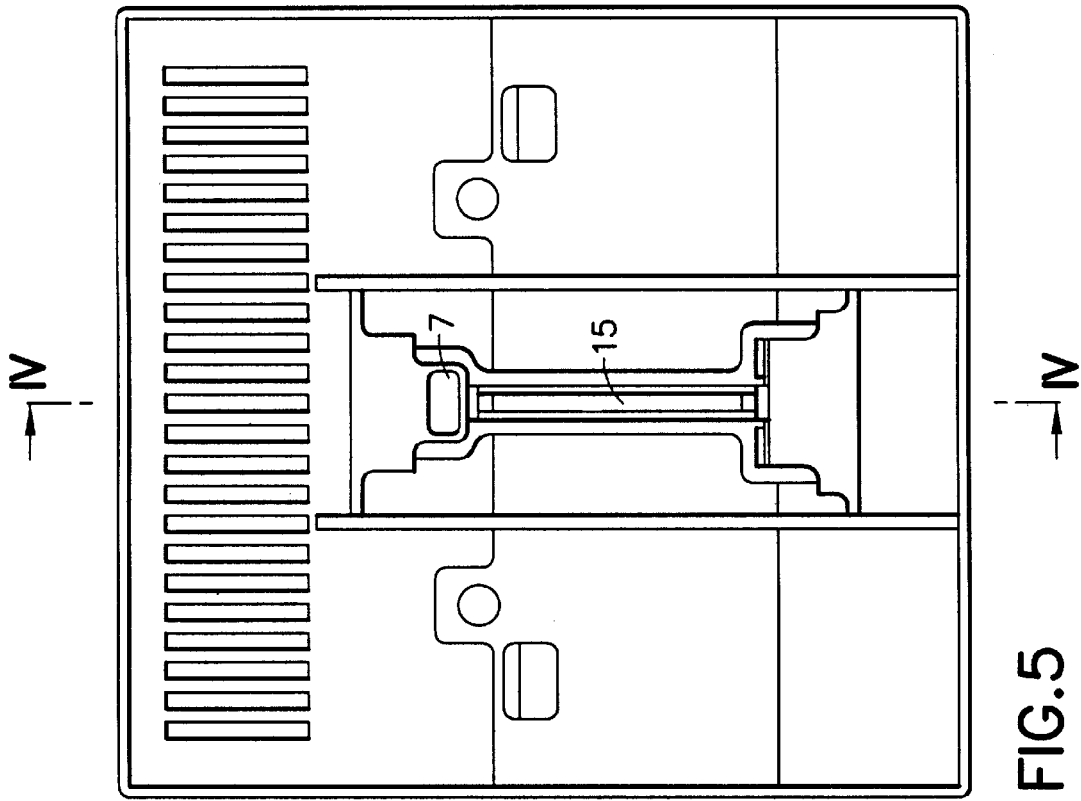
FIG. 5 is a front view of the module base shown in FIG. 4.

The positioning of the blind hole 7 is chosen so as to enable it to offer a tool inlet that is normally unobstructed by any wire that might hinder or prevent the tool from being inserted and moved in the necessary manner. The hole is therefore provided in the central portion of the base, in the embodiment presented, as shown in FIG. 5.

For reasons of thickness dimensioning, the hole is provided, in this example, on the other side of the one in which the back 0 of the base bears against the longitudinal abutment zones 1A and 1B of the rail 1 from the portion 6.

When the base 11 is one of the component parts of a module including a cover 12 that is positioned on the base, as shown in FIG. 3, an opening 21 is provided through the cover to enable a tool blade such as 8 to be inserted into the hole 7 of the driver device, and to be displaced in order to drive the device.

What is claimed is:

1. A clipping arrangement for clipping an electrical or electro-optical equipment module onto a support rail adapted to receive a plurality of said modules, the arrangement comprising a rigid hook-forming first portion adapted to hook onto a first edge of the rail, and a catch-forming second portion which is adapted to hook onto a second edge of the rail under the action of a resilient return force and which is actuated remotely by means of leverage from a force-transmitter device comprising a rigid piece elongate in shape connected via a first hinge to a driver device and via a second hinge to the catch-forming second portion, it thus being possible to position the driver device remotely from said catch-forming second portion on the opposite side of the base zone for bearing against the rail from said catch-forming second portion.

2. A clipping arrangement according to claim 1, wherein the catch-forming second portion, the driver device, and the force-transmitter device are made integrally from a molded material.

3. A clipping arrangement according to claim 1, wherein the driver device is in the form of a tubular element for receiving the tool-blade wherein the tubular element has an open end and an end wall, wherein the tubular element is connected firstly to the force-transmitter device via the first hinge in the vicinity of the end wall of the tubular element, and secondly to a rigid structure including the first portion of the arrangement via a third hinge which is situated in the vicinity of the open end; and wherein the catch-forming second portion is provided with a shaped-section, snap-fastening region of increased thickness for snap-fastening onto one edge of said rail, which region is carried by a segment of wall which has a free end on which the region of increased thickness is situated, and which is connected via a hinge arc to the rigid structure which includes the first portion of the arrangement, said segment of wall also being connected to the force-transmitter device via the second hinge situated between the hinge arc and the region of increased thickness on the same side of the segment of wall as said region of increased thickness.

4. A clipping arrangement according to claim 3, wherein the third hinge is situated on a side of said tubular element which is opposite from the side in which the first hinge connects said tubular element to the force-transmitter device.

5. An electrical or electro-optical equipment module adapted to be mounted on a rail serving as a support for a plurality of modules, said module including:

a clipping arrangement for clipping an electrical or electro-optical equipment module onto a support rail adapted to receive a plurality of said modules, the arrangement comprising a rigid hook-forming first portion adapted to hook onto a first edge of the rail, and a catch-forming second portion which is adapted to hook onto a second edge of the rail under the action of a resilient return force and which is actuated remotely by means of leverage from a force-transmitter device comprising a rigid piece elongate in shape connected via a first hinge to a driver device and via a second hinge to the catch-forming second portion, it thus being possible to position the driver device remotely from said catch-forming second portion on the opposite side of the base zone for bearing against the rail from said catchforming second portion.

6. An equipment module according to claim 5, wherein the equipment module is formed as an integrally molded single piece forming a base that includes the clipping arrangement.

7. An equipment module according to claim 6, further comprising a portion forming a cover which is positioned on the base over the mouth of the hole provided in the driver device, and wherein the cover is provided with an opening enabling the driver device to be driven by means of the tool having a blade whose end is inserted through said hole and into said driver device.

* * * * *

UNITED STATES PATENT AND TRADEMARK OFFICE
CERTIFICATE OF CORRECTION

PATENT NO. : 6,059,129
DATED : May 9, 2000
INVENTOR(S) : Bernard Bechaz, Luc Doutaz and Philippe France It is certified that error appears in the above-identified patent and that said Letters Patent is hereby corrected as shown below:

In the Abstract [57], line 7, after "by" please insert --means of--.

In column 1, line 23, "1 " should be --1'--.

In column 5, line 46, "same way hinge 19 is. It is" should be --same way. Hinge 19 is--

In column 8, line 5, "catchforming" should be --catch-forming--.

Signed and Sealed this

Twenty-second Day of May, 2001

*Attest:*

NICHOLAS P. GODICI

*Attesting Officer*   *Acting Director of the United States Patent and Trademark Office*